United States Patent
Smetana

(10) Patent No.: US 8,348,040 B2
(45) Date of Patent: Jan. 8, 2013

(54) FREEWHEEL COUPLING

(75) Inventor: Tomas Smetana, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 489 days.

(21) Appl. No.: 12/666,743

(22) PCT Filed: Jun. 18, 2008

(86) PCT No.: PCT/EP2008/057665
§ 371 (c)(1),
(2), (4) Date: Feb. 9, 2010

(87) PCT Pub. No.: WO2009/000716
PCT Pub. Date: Dec. 31, 2008

(65) Prior Publication Data
US 2010/0181157 A1   Jul. 22, 2010

(30) Foreign Application Priority Data
Jun. 27, 2007   (DE) .......................... 10 2007 029 812

(51) Int. Cl.
*F16D 41/12*   (2006.01)
(52) U.S. Cl. .......................................... 192/46; 192/108
(58) Field of Classification Search .................. 192/46, 192/69, 69.8, 108; 60/345
See application file for complete search history.

(56) References Cited

U.S. PATENT DOCUMENTS

| | | | | |
|---|---|---|---|---|
| 5,729,976 A | * | 3/1998 | Murata et al. .................. | 60/345 |
| 6,553,758 B2 | * | 4/2003 | Reinhart et al. ............... | 60/345 |
| 7,849,990 B2 | * | 12/2010 | Brees et al. .................... | 192/46 |
| 8,132,656 B2 | * | 3/2012 | Brees et al. .................... | 192/46 |
| 2001/0027649 A1 | | 10/2001 | Reinhart et al. | |

FOREIGN PATENT DOCUMENTS

| | | |
|---|---|---|
| EP | 0 811 788 A | 12/1997 |
| FR | 1 238 625 A | 8/1960 |

* cited by examiner

*Primary Examiner* — David D Le
*Assistant Examiner* — Jacob S Scott
(74) *Attorney, Agent, or Firm* — Lucas & Mercanti, LLP; Klaus P. Stoffel

(57) ABSTRACT

A form-fitting freewheel coupling, which has a first and second clamping track with latching structures, a gap space between the clamping tracks, and a clamping ring arranged in the gap space. The clamping ring has clamping tongues facing toward the first clamping track and clamping tongues facing toward the second clamping track. A drag ring is arranged in the gap space. The drag ring is pivotable to a limited extent, relative to the clamping ring and is spring-loaded against one of the clamping tracks and interacts with the clamping ring in such a way that, in the event of a rotation of the first clamping track relative to the second clamping track in the freewheel direction, the clamping ring is lifted fully from one of the clamping tracks, while the clamping tongues, which face away from the clamping track, protrude into the latching structures of the opposite clamping track.

17 Claims, 16 Drawing Sheets

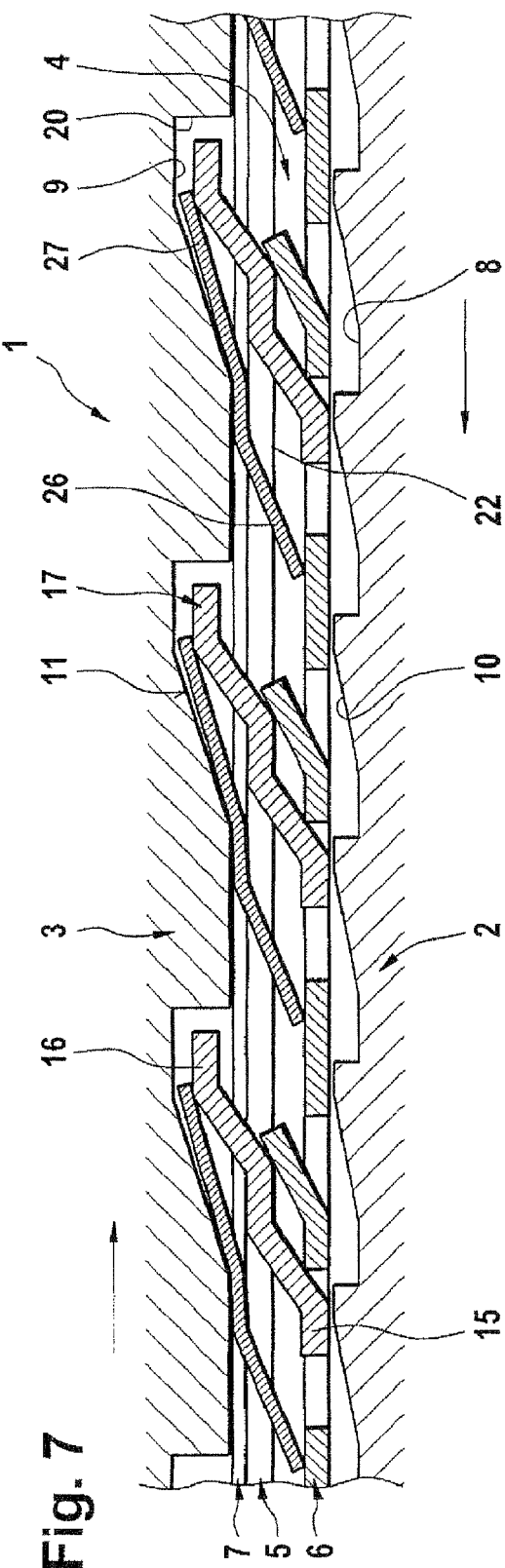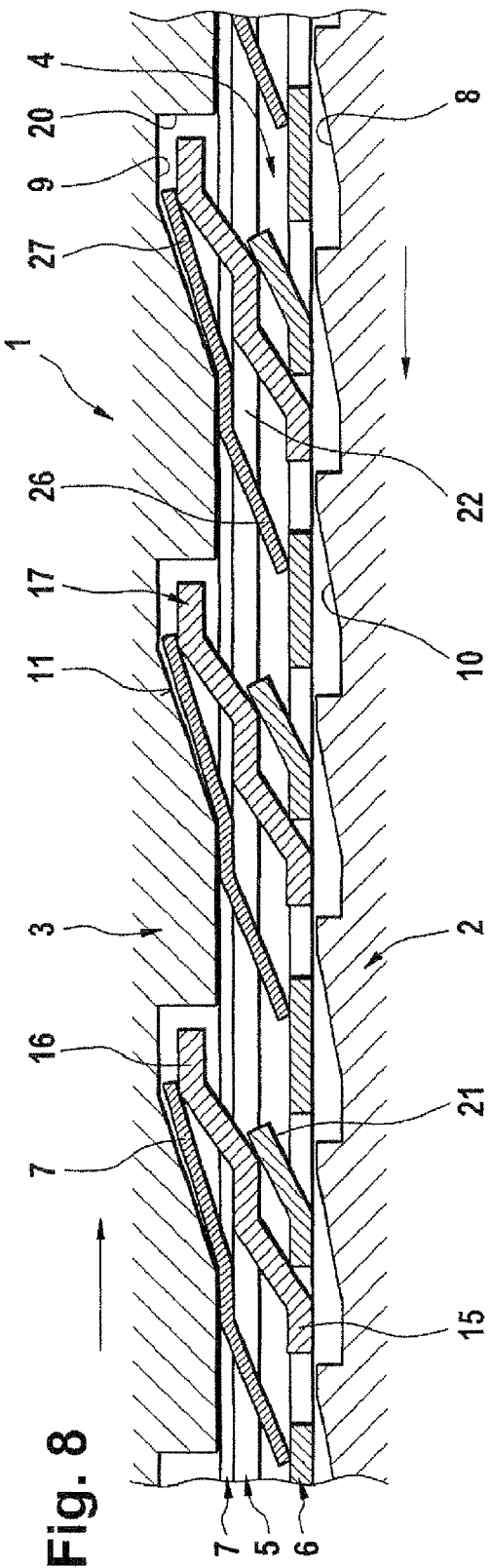

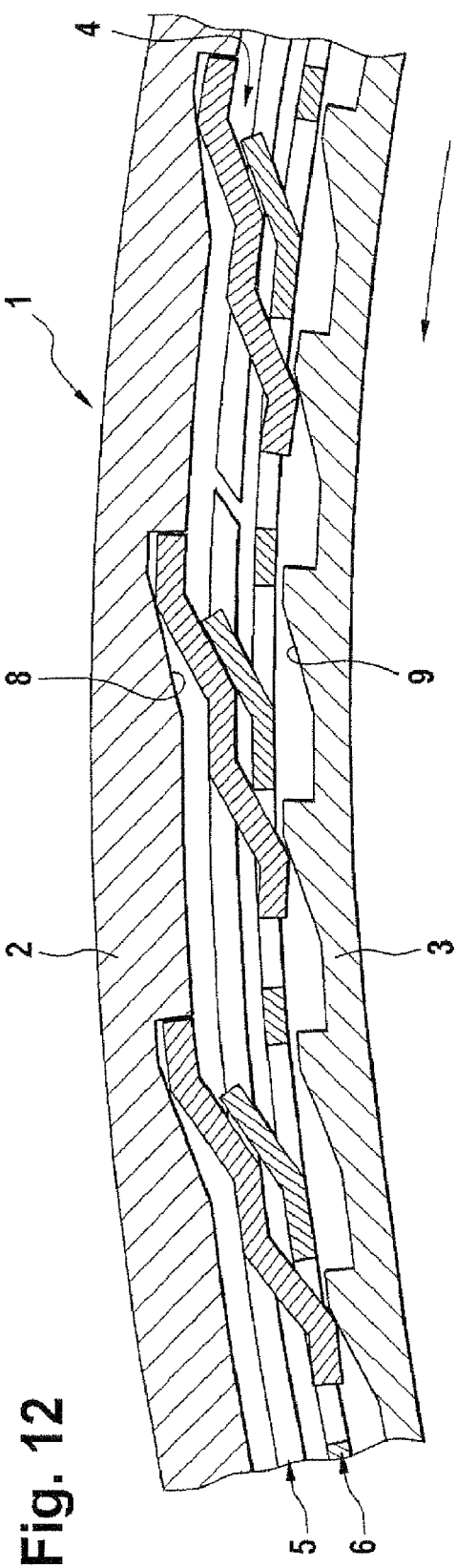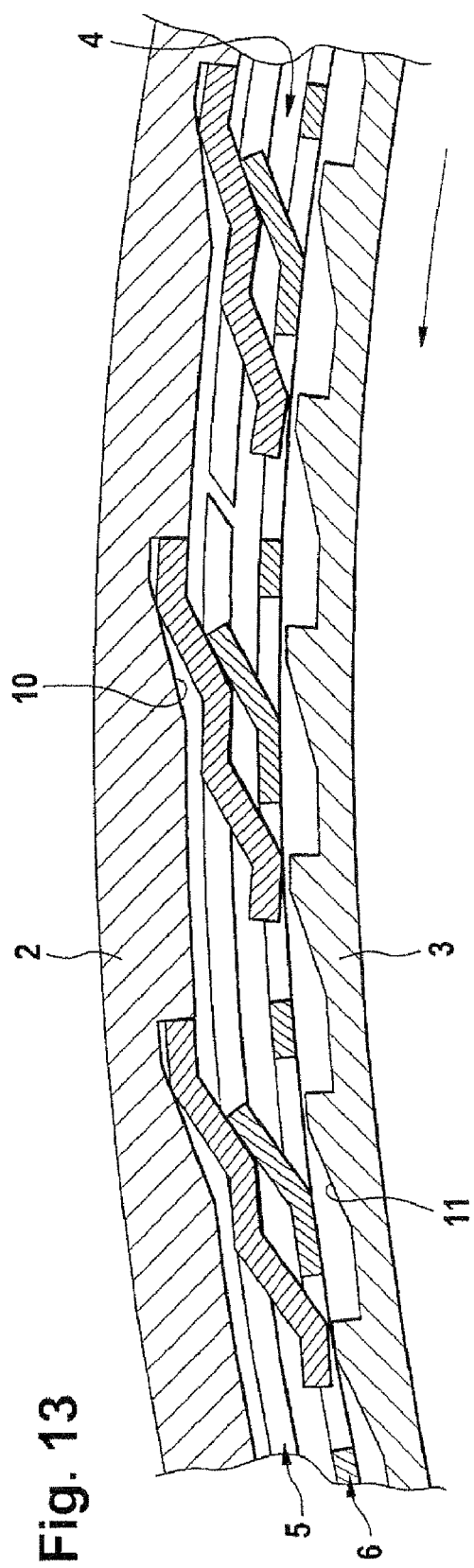

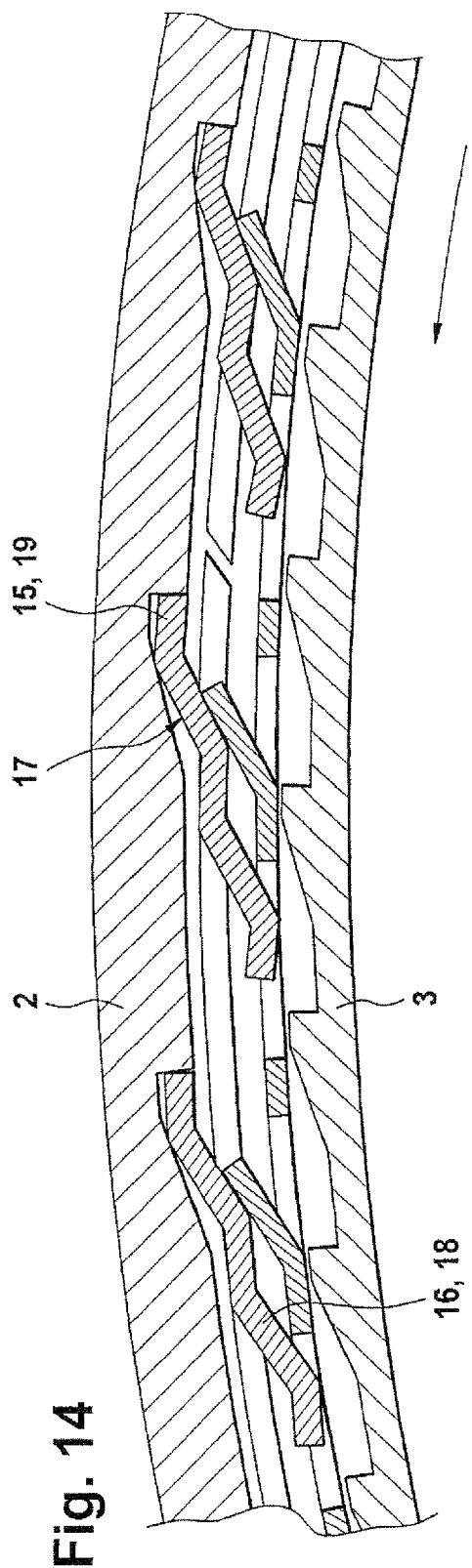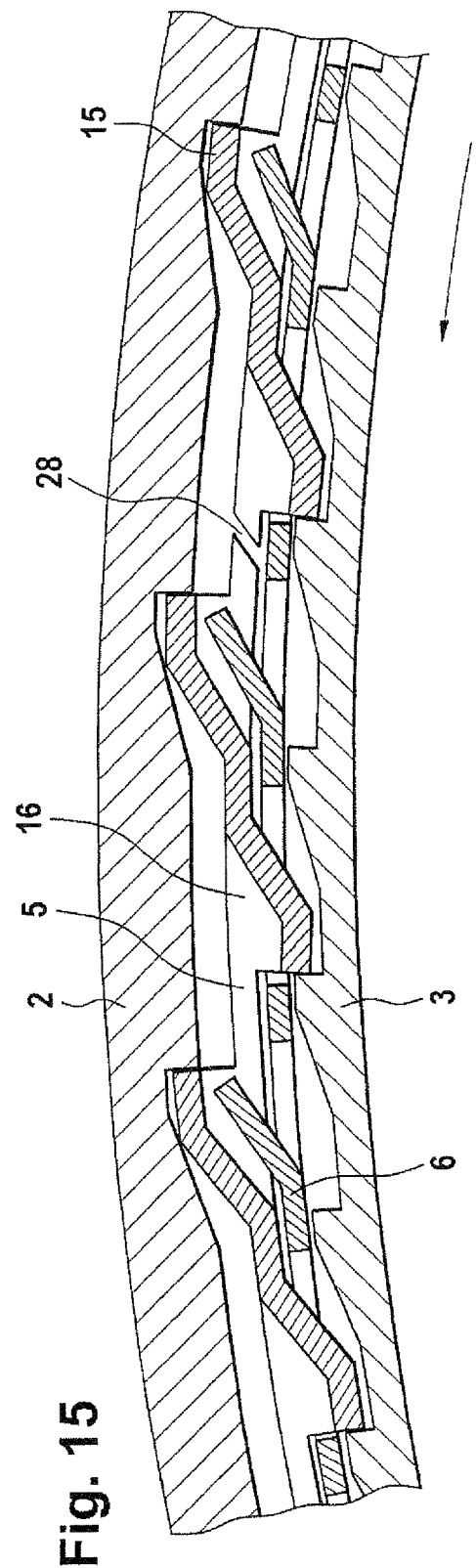

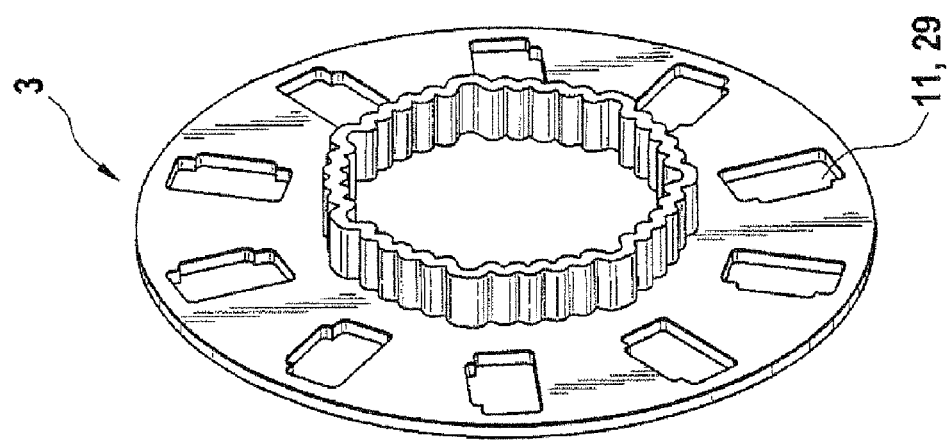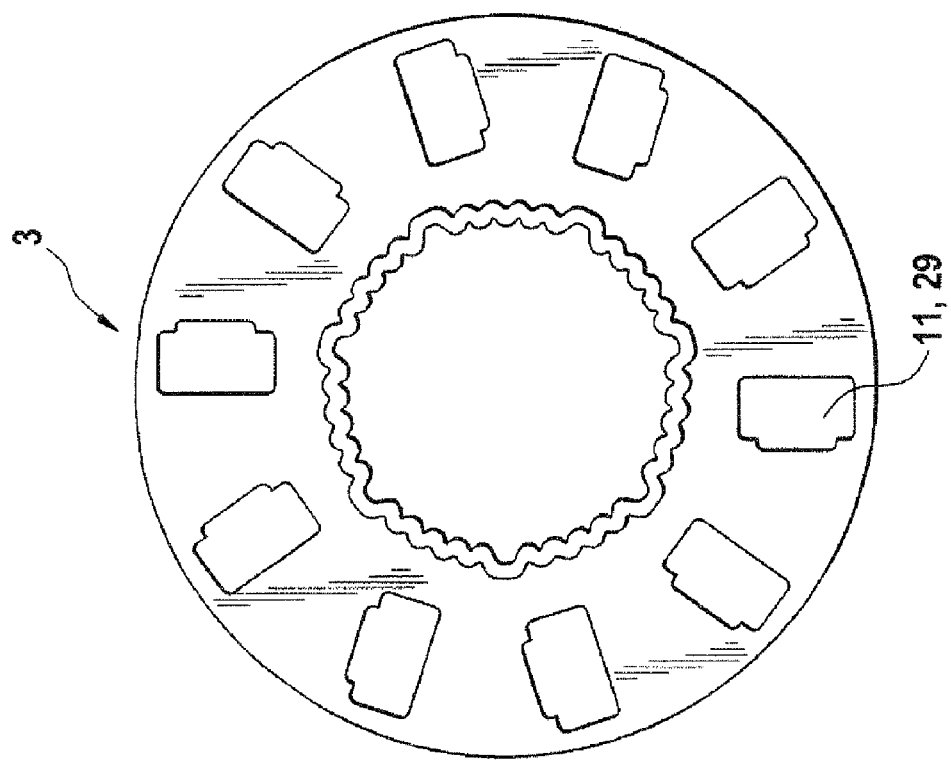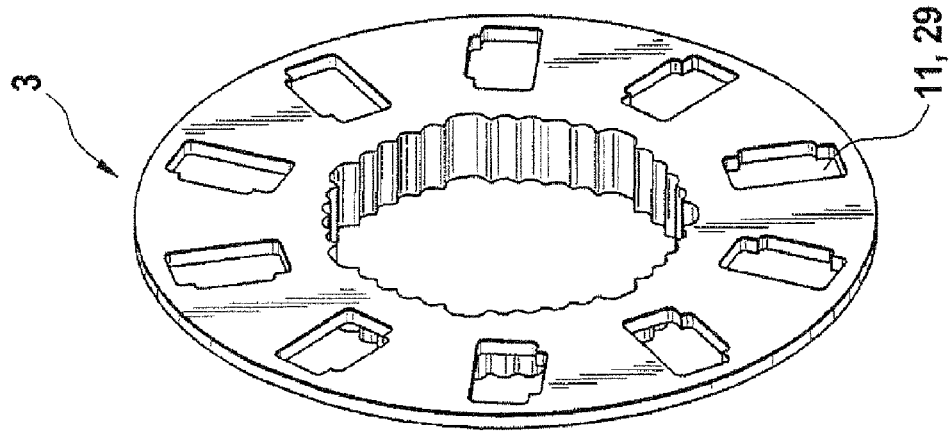
Fig. 19

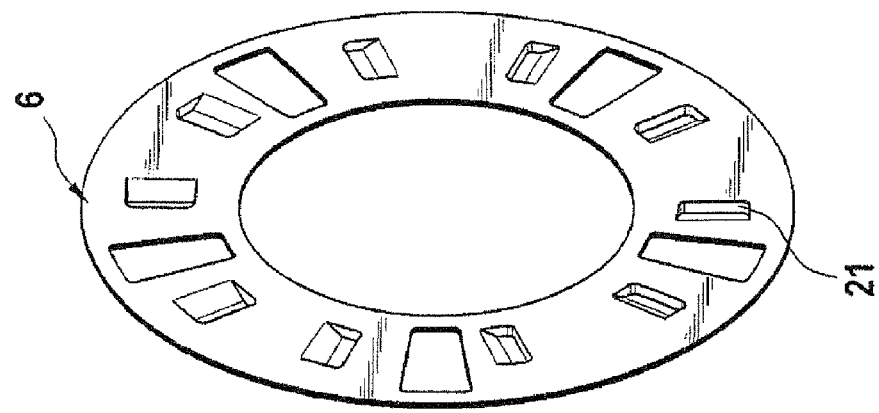
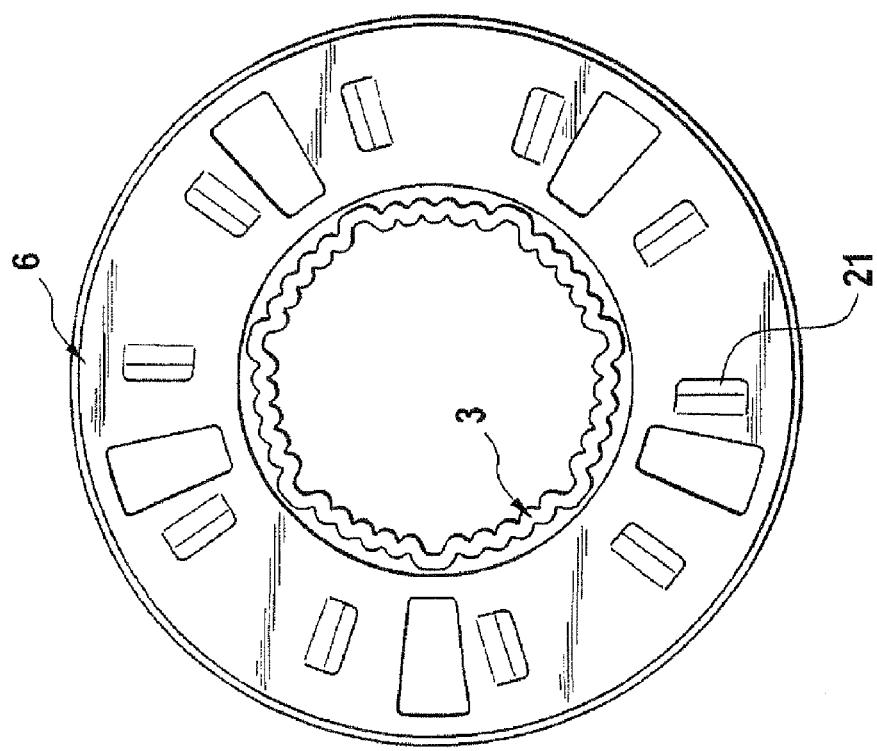
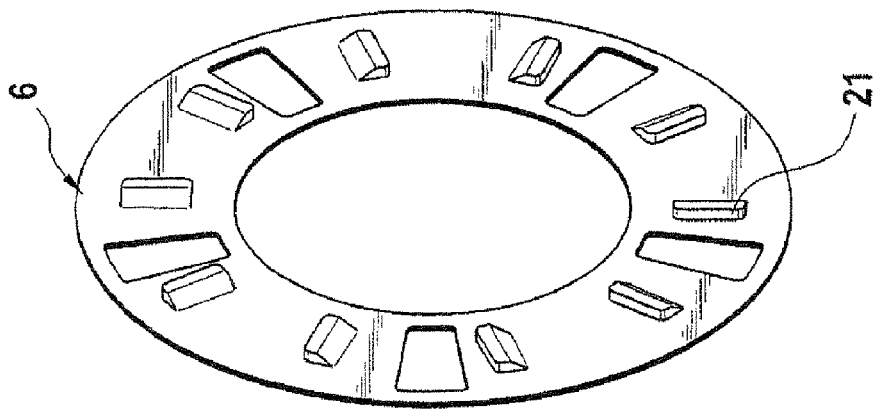
Fig. 22

FREEWHEEL COUPLING

This application is a 371 of PCT/EP2008/057665 filed Jun. 18, 2008, which in turn claims the priority of DE 10 2007 029 812.0 filed Jun. 27, 2007, the priority of both applications is hereby claimed and both applications are incorporated by reference herein.

FIELD OF INVENTION

The invention relates to a positive freewheel coupling also designated as a ratchet.

BACKGROUND OF THE INVENTION

A positively operating freewheel coupling mechanism is known, for example, from EP 0 811 788 B1. This freewheel mechanism is provided for torque converters and is to be distinguished in that impact noises are suppressed. EP 0 811 788 B1 discloses two different forms of construction, in the first form of construction of the freewheel a first running ring being displaceable axially in relation to a second running ring, while, in the second form of construction, the two running rings are spaced apart from one another in an axially invariable manner. In both forms of construction, an intermediate element is arranged between the running rings and cooperates with teeth on the running rings.

OBJECT OF THE INVENTION

The object on which the invention is based is to develop further a positive freewheel, with respect to the prior art, in such a way that, based on a single structural principle, an especially simple adaptation of the mechanical properties to the operating conditions is possible.

SUMMARY OF THE INVENTION

This object is achieved, according to the invention, by means of a positive freewheel coupling having the features of patent claim 1. This freewheel coupling comprises two clamping tracks in each case having a number of latching structures, a clamping ring and a drag ring being arranged in the gap space formed between the clamping tracks. The latching structures comprise, for example, clamping ramps or clearances. The clamping ring is intended, in cooperation with the drag ring and with the latching structures, for preventing a rotation of the first clamping track in relation to the second clamping track in a first direction of rotation, whereas a rotation in the opposite direction is enabled. In the first instance, that is to say, with the freewheel blocked, a first group of clamping tongues connected to the clamping ring and formed, in particular, in one piece with the latter engages into latching structures on the first clamping track, while a second group of clamping tongues of the clamping ring engages into latching structures of the second clamping track. By the positive connection between the clamping tracks being made via the clamping tongues, on the one hand, a reliable blocking of the freewheel coupling in the locking direction is afforded and, on the other hand, the conduction of the force flux and torque flux through the clamping tongues offers the possibility of implementing further advantageous mechanical properties in addition to the straightforward blocking action. In particular, the clamping tongues can be configured elastically in such a way that force and torque peaks occurring at the moment of blocking are damped.

During the transition from the locked position of the freewheel into the operation of the freewheel, the drag ring, which is pivotable to a limited extent in relation to the clamping ring and is sprung toward one of the clamping tracks, ensures that the clamping ring is displaced in the gap space, at the same time lifting off completely from one of the clamping tracks, while the clamping tongues facing away from this clamping track penetrate into the latching structures of the opposite clamping track. Freewheel operation without rattling or clicking noises is consequently afforded. In contrast to the clamping ring, the drag ring does not exert a blocking action in any operating state. A moment of friction occurring between the drag ring and one of the clamping tracks during freewheel operation can be set, independently of the form of the clamping ring, by means of the configuration and/or springing of the drag ring. The drag ring may be configured in such a way that it serves at the same time as a plain bearing between the clamping tracks. In contrast to the clamping ring, during the transition from the freewheel operation into the blocked state of the freewheel coupling, the drag ring is not displaced orthogonally between the clamping tracks.

In a first form of construction, designated as an axial ratchet, the clamping ring and the drag ring are arranged axially between the clamping tracks. In a preferred refinement, in this case, a spring ring is arranged in the gap space in addition to the clamping ring and to the drag ring. This spring ring loads at least the drag ring with an axial force in the direction toward one of the clamping tracks. Preferably, by means of the spring ring, the clamping ring is also acted upon by a force in the same direction. In a form of construction which, overall, is narrow and can be produced efficiently, the spring ring has two annular marginal strips which are connected to one another by means of webs running in the radial direction, in each case a spring tongue projecting out of each web on both sides. In this case, one of the spring tongues is intended for springing the clamping ring, while the other spring tongue springs the drag ring. The spring action arises at least partially, preferably for the most part, as a result of the torsion of the web between the marginal strips. Consequently, in an advantageous way, the spring forces acting on the clamping ring and on the drag ring exert a mutual influence one upon the other. A springing of the drag ring onto one of the clamping tracks which is strong in comparison with the spring forces acting on the clamping ring can be implemented in a simple way in that the spring tongue contacting the drag ring is shorter than the spring tongue contacting the clamping ring. The three parts, namely the spring ring, clamping ring and drag ring, can be inserted into the gap space loosely, that is to say without any firm connection with one another or with one of the clamping tracks. To simplify assembly, it is also possible to fix the spring ring to the inner ring. In both instances, the axial distance between the clamping tracks is invariable during the operation of the freewheel coupling.

In a second form of construction of the freewheel coupling, designated as a radial ratchet, the clamping ring and the drag ring are arranged radially between the clamping tracks. In contrast to the first form of construction, preferably no separate spring is provided in this form of construction. Instead, the clamping ring may function as a spring element. The clamping ring is in this case designed essentially as a bent band, between the ends of which a slot remains free. The clamping ring, which is under mechanical tension, springs the drag ring onto one of the clamping tracks, preferably onto the inner ring. Additionally or alternatively, the drag ring may be designed in such a way that it acts as a spring element. The drag ring is also preferably slotted in a similar way to the clamping ring.

With regard to both the axial and the radial ratchet, the clamping ring is preferably shaped in such a way that each clamping tongue facing the first clamping track forms, together with a clamping tongue facing the second clamping track, a double clamping tongue which, for example, is held between two marginal strips of the clamping ring by means of a web, the double clamping tongues and the webs being formed in one piece with the marginal strips. The webs run in the radial direction of the freewheel coupling in the case of the axial ratchet, and in the axial direction thereof in the case of the radial ratchet. In both instances, especially with regard to the radial ratchet, a resilient torsion of the double clamping tongue about the web is possible at least to a slight extent.

According to an alternative form of construction suitable especially for the transmission of higher torques, a higher torsional rigidity of the clamping tongues can be achieved if the clamping tongues are designed as clamping pockets connected to the marginal strips. In this case, a clamping pocket is connected in one piece to the marginal strips along at least half of its length measured in the circumferential direction, preferably along its entire extent in this direction. Torsion within the clamping ring may in this case occur in circumferential portions outside the clamping pockets. The number of the clamping pockets facing the first clamping track is not necessarily identical to the number of the clamping pockets facing the second clamping track.

In a section drawn orthogonally to the clamping tracks, the clamping tongues preferably have in each case an inner portion and an outer portion, the outer portion being inclined to a lesser extent in relation to the marginal strip of a clamping ring than the inner portion. The end of the outer portion of the clamping tongue is in this case intended to bear against a stop face delimiting a clamping structure, for example a clamping ramp or a clearance designed as a through orifice. The surface normal of the stop face preferably encloses a right angle with the axis of rotation of the freewheel coupling.

The clamping ring and the drag ring can be produced especially efficiently as sheet metal parts formed in a non-cutting manner. While the clamping ring is preferably manufactured from steel, for example brass or bronze is also suitable, as well as steel, for producing the drag ring. In a preferred refinement, irrespective of the material, the drag ring has marginal strips and control faces which are inclined in relation to these and which are intended to cooperate with the clamping ring, that is to say to displace the clamping ring within the gap space. Plastics, especially fiber-reinforced plastics, are also suitable for manufacturing the drag ring. The clamping tracks are formed by parts which are produced, for example, by means of broaching, deep drawing or sintering or from sheet metal. These parts are designated as the inner ring and outer ring and the corresponding clamping tracks as the inner clamping track and outer clamping track without any restriction in generality.

Four exemplary embodiments of the invention are explained in more detail below with reference to a drawing in which:

BRIEF DESCRIPTION OF THE DRAWING

FIGS. 6 to 8 show the freewheel coupling according FIG. 1 in various operating states, in each case in a view similar to FIG. 2;

FIGS. 12 to 14 show the freewheel coupling according to FIG. 9 in various operating states;

FIG. 15 shows an embodiment, modified with respect to the embodiment according to FIG. 9, of a freewheel coupling;

FIG. 19 shows an inner ring of the freewheel coupling according to FIG. 18;

FIG. 22 shows a drag ring and the inner ring of the freewheel coupling according to FIG. 18.

DETAILED DESCRIPTION OF THE DRAWING

Figure 1:
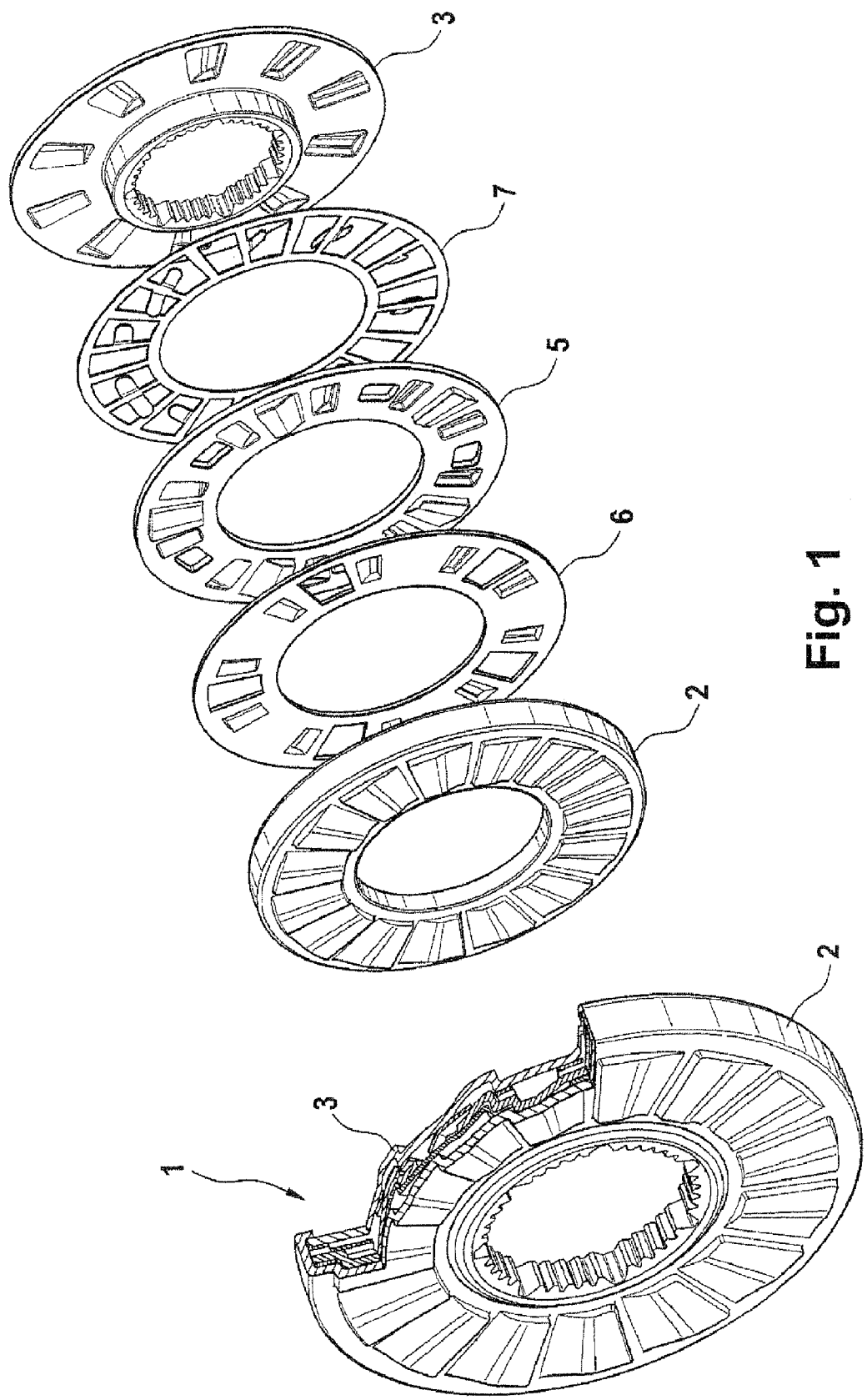
FIG. 1 shows a first exemplary embodiment of a positive freewheel coupling in an exploded illustration.

Mutually corresponding or identically acting parts are identified in all the figures by the same reference symbols. Each of the embodiments explained below is suitable especially for use in a torque converter.

A freewheel coupling 1 illustrated in FIGS. 1 to 8 is designed as an axial ratchet and has an outer ring 2 and an inner ring 3, the outer ring 2 being connected to a shaft and the inner ring 3 to a guide wheel in a way not illustrated. Between the outer ring 2 and the inner ring 3 is formed an annular gap space 4 in which a clamping ring 5, a drag ring 6 and a spring ring 7 are arranged. The outer ring 2 and the inner ring 3 form clamping tracks 8, 9 which in each case have latching structures 10, 11, in the present case in the form of clamping ramps. The number of clamping ramps 10 on the outer ring 2 is higher than the number of clamping ramps 11 on the inner ring 3. The distance, designated by H, between the clamping tracks 8, 9 is constant in any operating state of the freewheel coupling 1. The position of the axis of rotation A of the freewheel coupling 1 is indicated by a dashed and dotted line.

Figure 2:
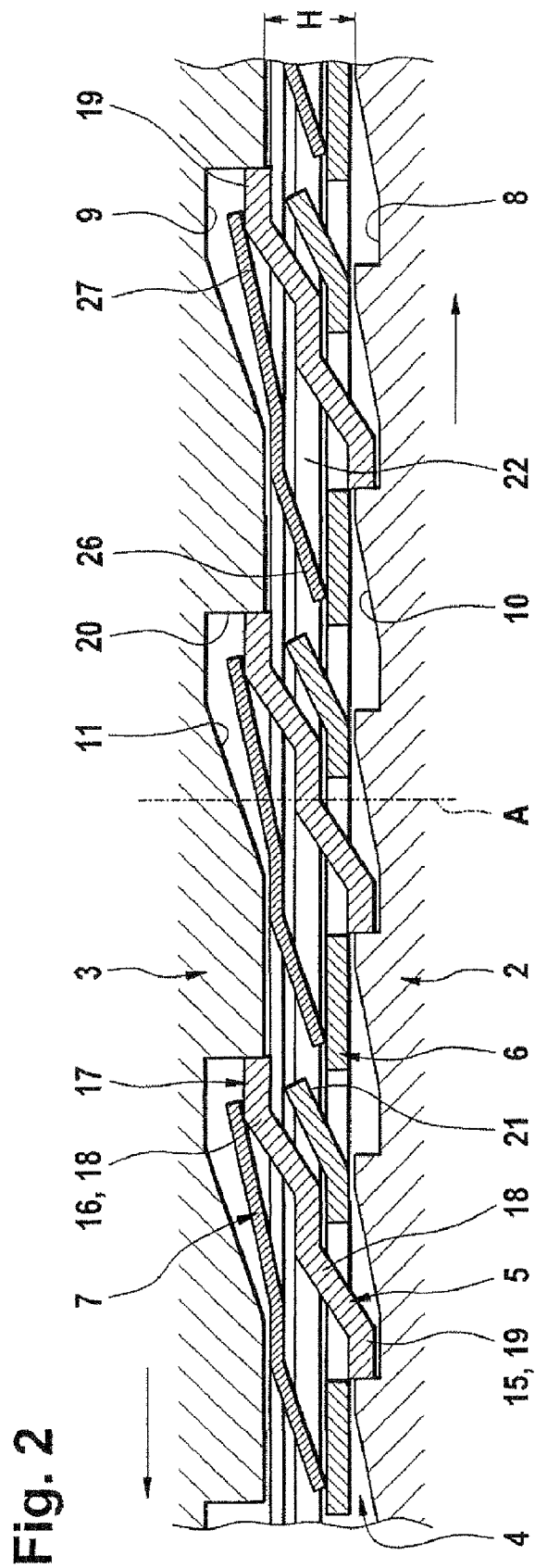
FIG. 2 shows, as a detail, the freewheel coupling according to FIG. 1 in a sectional illustration.
Figure 3:
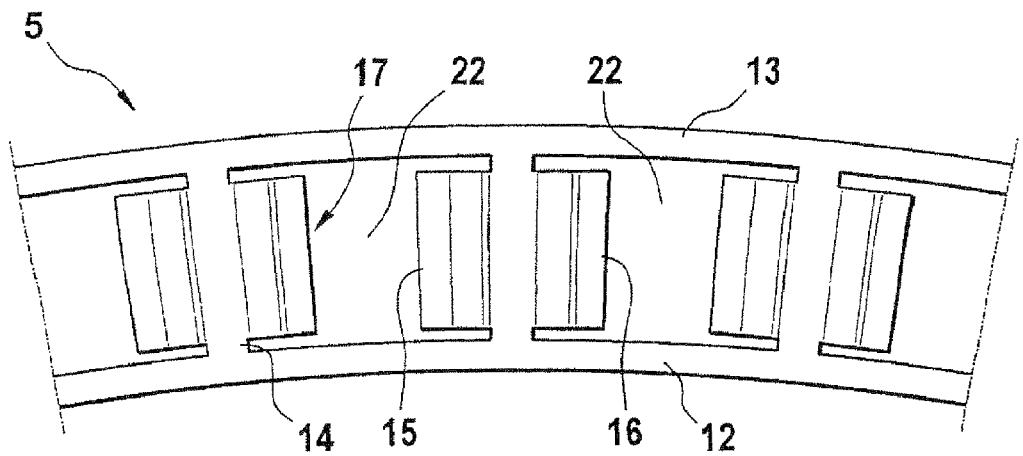
FIG. 3 shows a clamping ring of the freewheel coupling according to FIG. 1.
Figure 4:
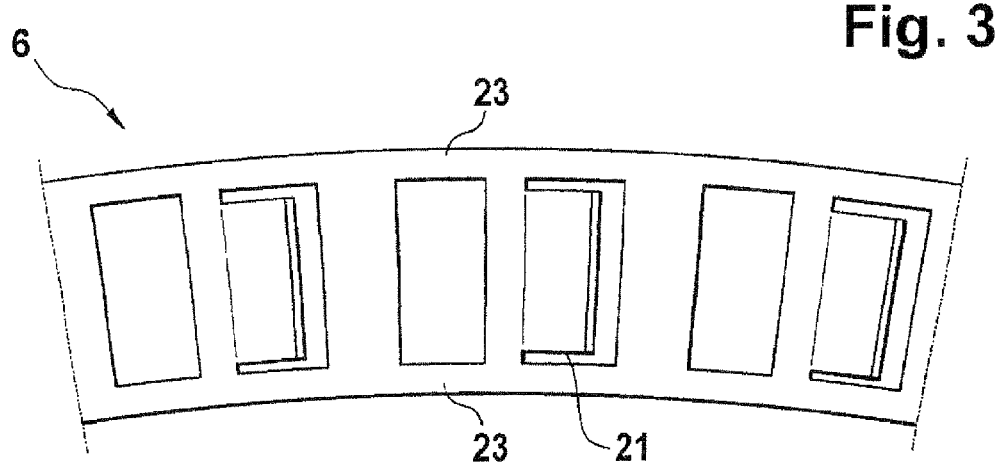
FIG. 4 shows a drag ring of the freewheel coupling according to FIG. 1.
Figure 5:
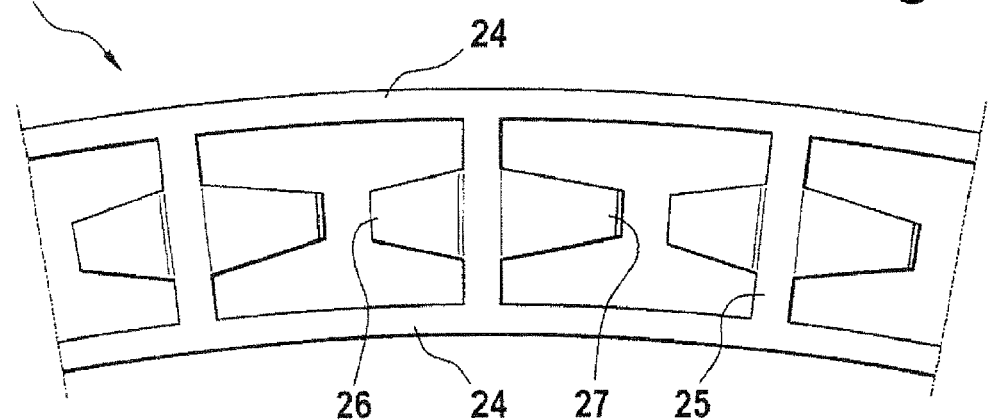
FIG. 5 shows a spring ring of the freewheel coupling according to FIG. 1.

The clamping ring 5 has two circumferential marginal strips 12, 13, the inner marginal strip 12 being connected to the outer marginal strip 13 by means of webs 14 running in the radial direction. Clamping tongues 15, 16 are formed on each web 14 on both sides, this producing what are known as double clamping tongues 17. Each clamping tongue 15, 16 has an inner portion 18 adjoining the web 14 and an outer portion 19 bent in relation to the inner portion, the last-mentioned portion 19 lying essentially in a plane normal to the axis of rotation A, while the inner portion 18 is inclined to a greater extent with respect to the marginal strips 12, 13. If the freewheel coupling 1 is in the blocking position, as illustrated in FIG. 2, the ends of the outer portions 19 bear against stop faces 20 which delimit the clamping ramps 10, 11. By contrast, the inner portions 18 have no contact with the clamping ramps 10, 11 and ensure, in cooperation with the webs 14, an at least slight elastic flexibility of each double clamping tongue 17.

The drag ring 6, also designated as a drag cage, is arranged essentially axially between the clamping ring 5 and the outer ring 2, individual control faces 21 of the drag ring 6 projecting beyond the marginal strips 12, 13 of the clamping ring 5 in the axial direction. The control faces 21 in each case engage into an aperture 22 in the clamping ring 5 and are intended to cooperate with the double clamping tongues 17.

The individual control faces 21 are arranged between marginal strips 23 of the drag ring 6 and are formed in a similar way to the clamping tongues 15, 16 with the aid of stamping and bending processes.

The spring ring 7 is arranged on that side of the clamping ring 5 which faces the inner ring 3 and serves for springing both the drag ring 6 and the clamping ring 5 onto the outer ring 2. In a basically comparable way to the clamping ring 5 and to the drag ring 6, the spring ring 7 also has circumferential marginal strips 24 which are connected to one another by means of webs 25 running in the radial direction. Where the spring ring 7 is concerned, two spring tongues 26, 27 are formed onto each web 25, the shorter spring tongue 26 being intended for springing the drag ring 6 and the longer spring tongue 27 for springing the clamping ring 5. The spring action of the two spring tongues 26, 27 is mainly produced as a result of the torsion of the web 25.

Figure 6:
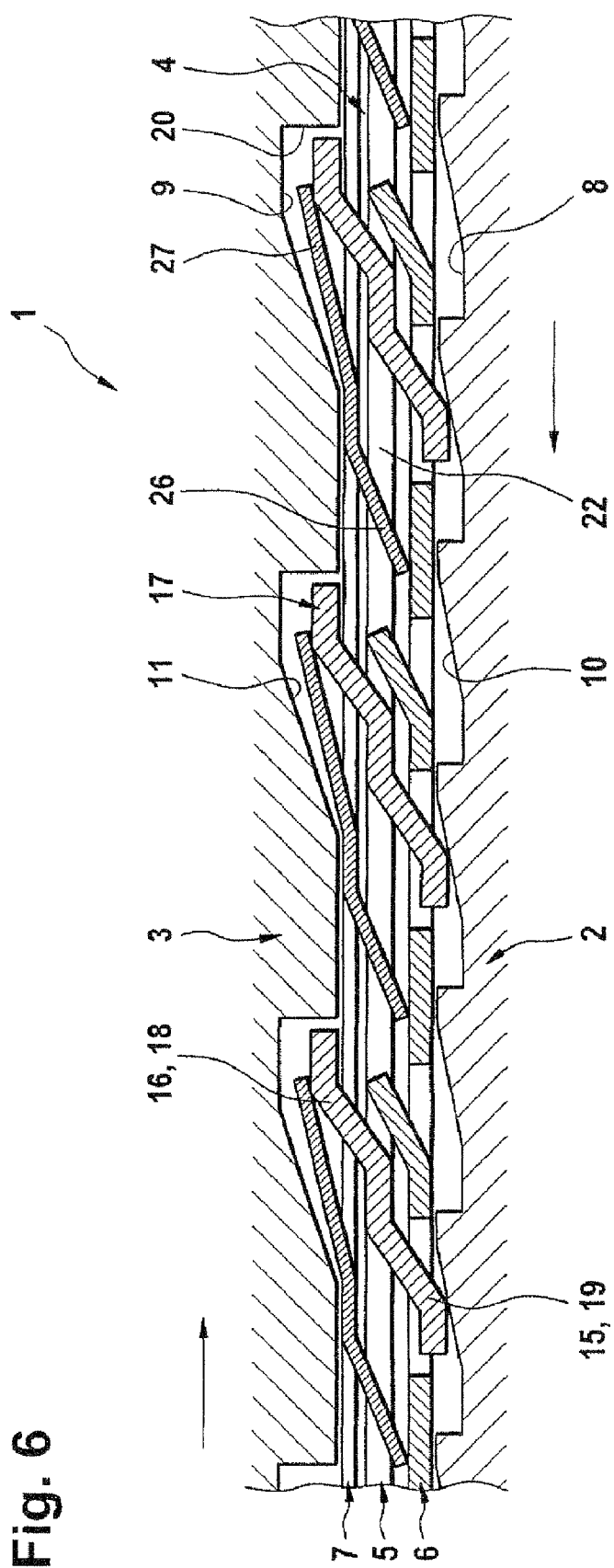
Figure 9:
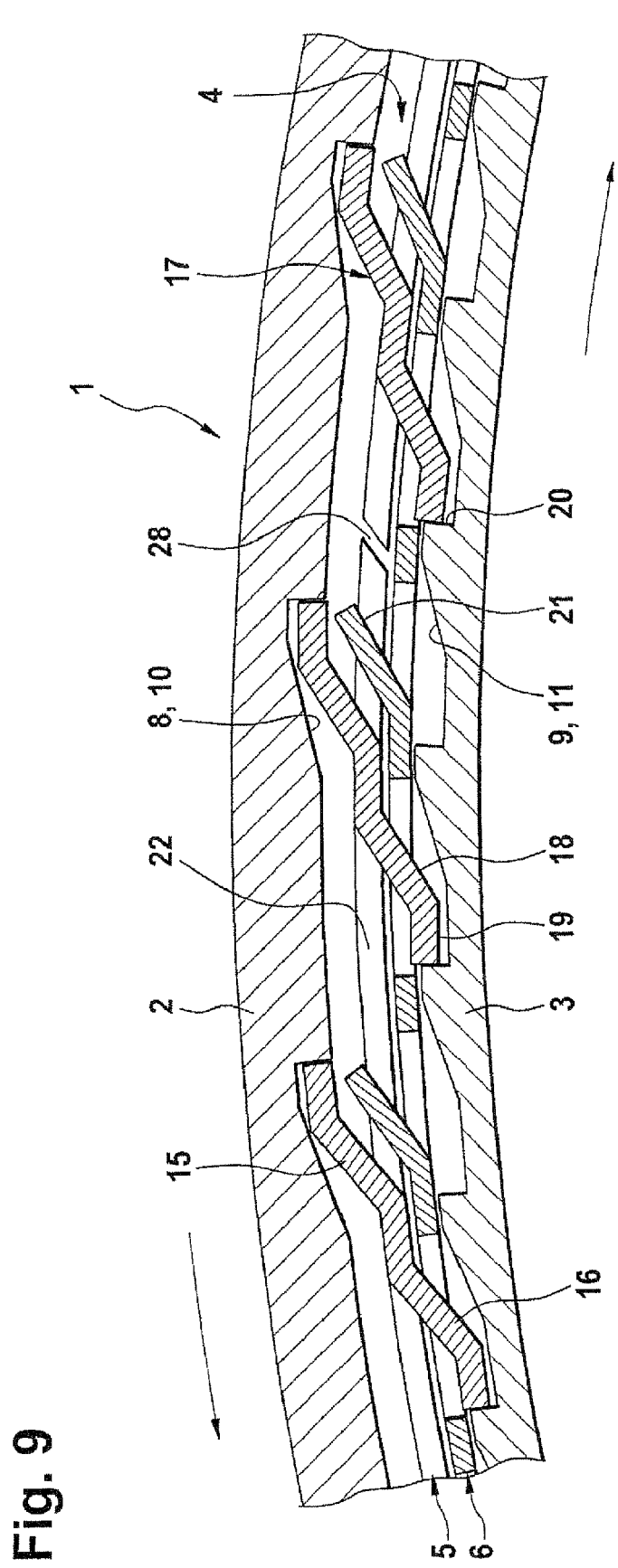
FIG. 9 shows a second exemplary embodiment of a positive freewheel coupling in a sectional illustration.
Figure 10:
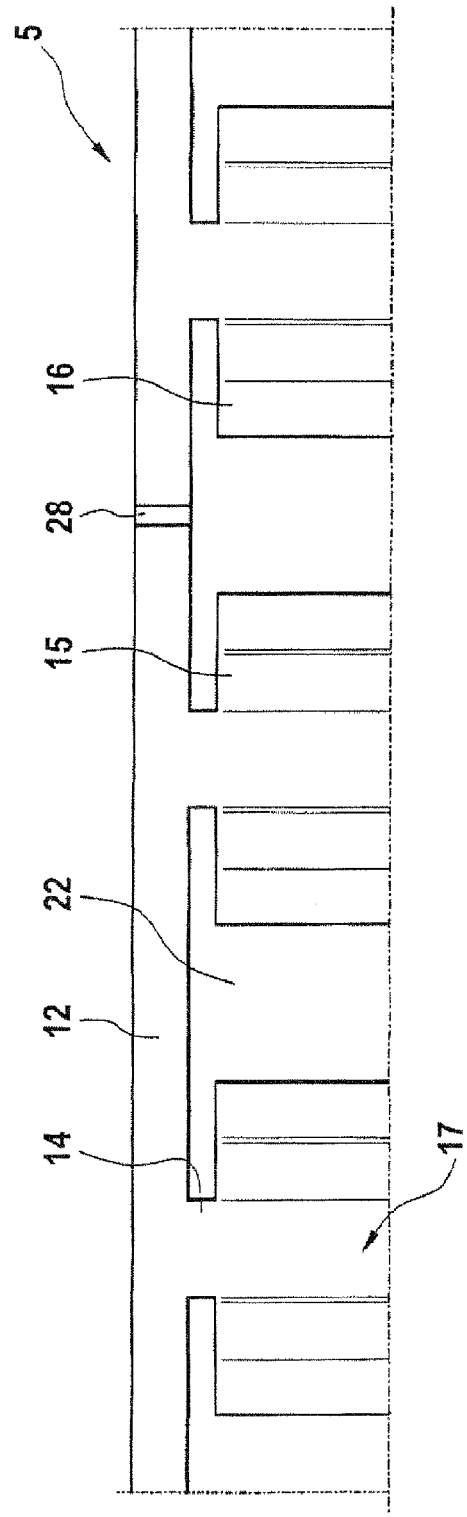
FIG. 10 shows a clamping ring of the freewheel coupling according to FIG. 9.
Figure 11:
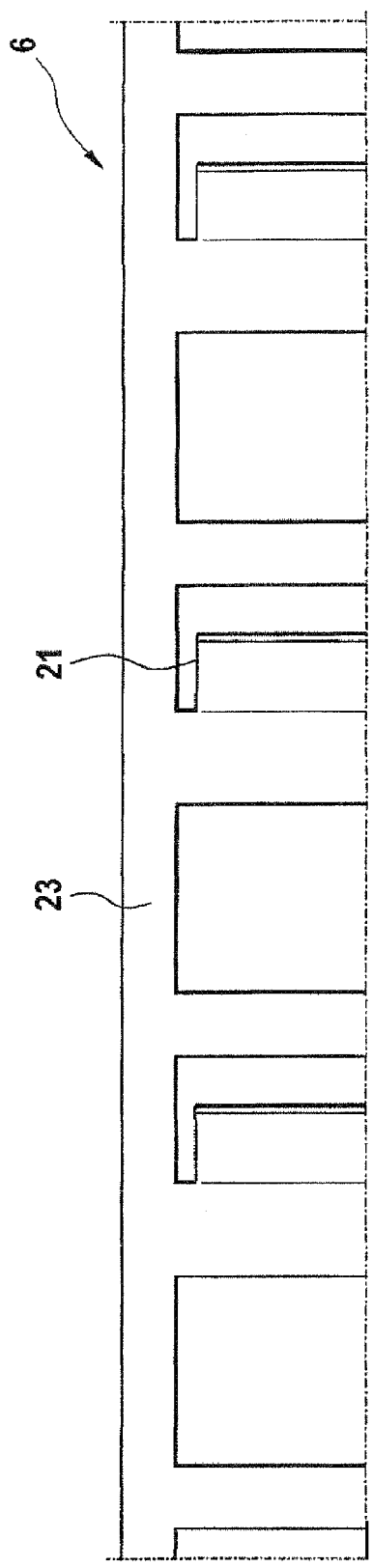
FIG. 11 shows a drag ring of the freewheel coupling according to FIG. 9.

The transition between the blocked position of the freewheel 1 and freewheel operation is illustrated by FIGS. 6 to 8. As soon as the outer ring 2 commences to rotate in relation to the inner ring 3 (FIG. 6), as indicated by arrows, the drag ring 6 is shifted, after initially co-rotating, with the outer ring 2 under the clamping ring 5 in such a way that the control faces 21 displace the double clamping tongues 17 and consequently the entire clamping ring 5 in the direction of the inner ring 3. The clamping tongues 16 facing the clamping track 9 on the inner ring 3 in this case penetrate into the corresponding clamping ramps 11, until the clamping ring 5 is lifted off completely from the outer ring 2 (FIG. 8). In freewheel operation, while the clamping ring 5, the drag ring 6 and the spring ring 7 are stationary with respect to the inner ring 3, only a drag moment between the drag ring 6 and the outer ring 2 has to be overcome. This drag moment is sufficient to convert a pivoting movement of the drag ring 6 into an axial movement of the clamping ring 5. This applies both during the transition into freewheel operation and during the reverse action, that is to say during the renewed blocking of the freewheel coupling 1.

The embodiment according to FIGS. 9 to 14 relates, in contrast to the embodiment according to FIGS. 1 to 8, to a radial ratchet. In this case, the gap space 4 is formed radially between the outer ring 2 and the inner ring 3. The clamping ring 5 can be produced from a stamped sheet metal band, with material being utilized very efficiently, a slot 28 remaining between the ends of the band bent into a ring. The entire clamping ring 5 is designed as a spring element and is pressed against the inner ring 3. There is therefore no need for a separate spring element. Located radially between the clamping ring 5 and the inner ring 3 is the drag ring 6 which in this case, too, has control faces 21. The drag ring 6 may also be slotted in a way not illustrated. When the drag ring 6 is shifted under the clamping ring 5 (FIGS. 12-14) in the cancellation of the blocking of the freewheel coupling 1, said clamping ring is expanded somewhat. At the same time, a slight torsion of each double clamping tongue 17 about the associated web 14 takes place. The basic functioning of the radial ratchet according to FIGS. 9 to 14 otherwise corresponds to the functioning of the axial ratchet according to FIGS. 1 to 8.

Figure 16:
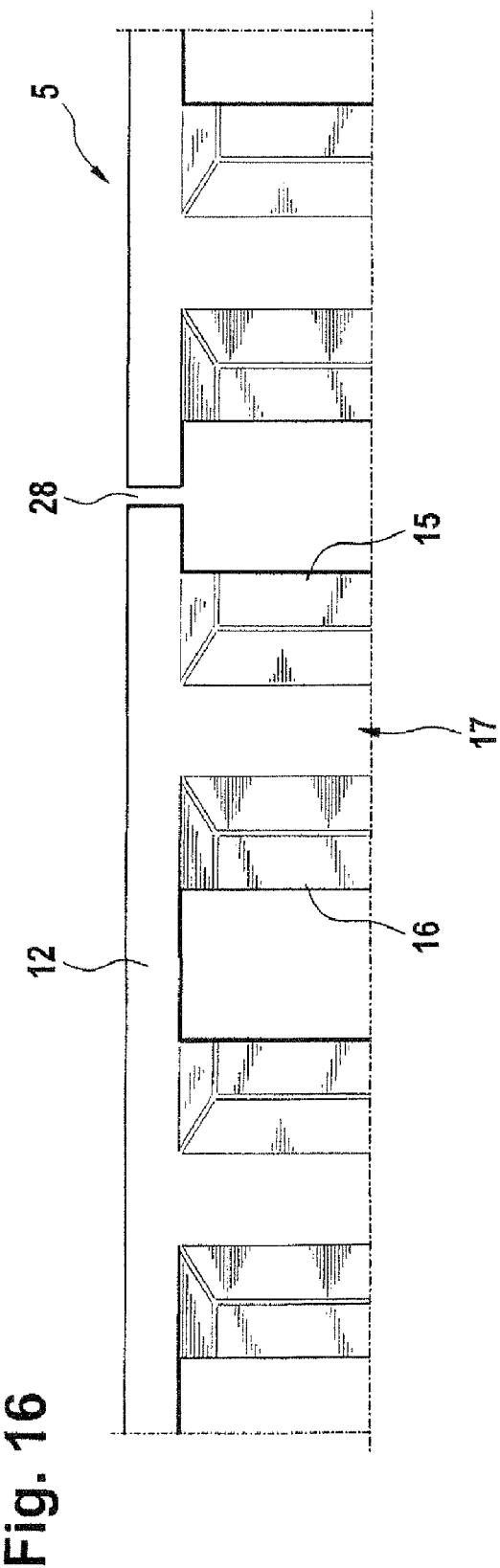
FIG. 16 shows a clamping ring of the freewheel coupling according to FIG. 15.
Figure 17:
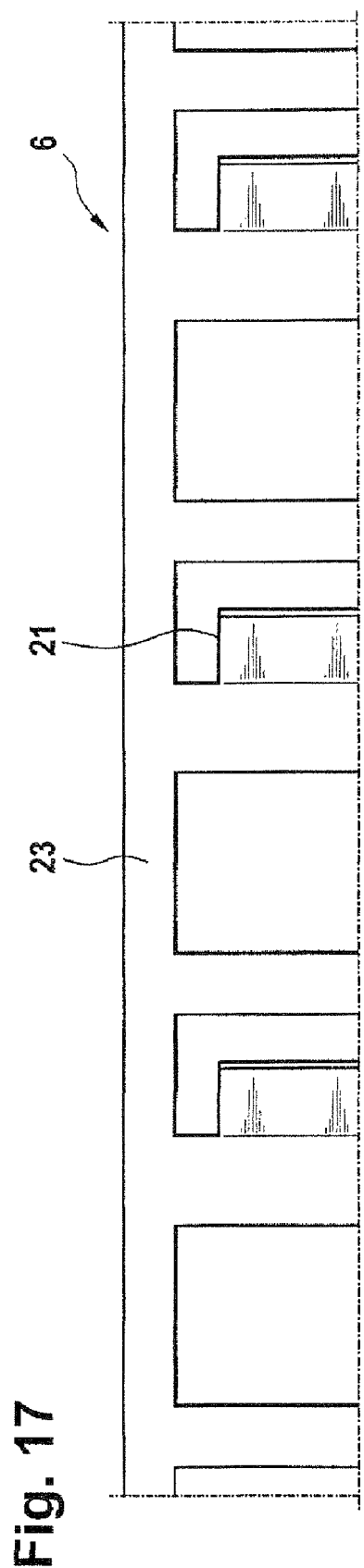
FIG. 17 shows a drag ring of the freewheel coupling according to FIG. 15.

The embodiment according to FIGS. 15 to 17 relates to a radial ratchet which differs from the embodiment according to FIGS. 9 to 14 in the configuration of the double clamping tongues 17: the clamping tongues 15, 16 are designed as deep-drawn clamping pockets, the double clamping tongue 17 being connected to the marginal strips 12, 13 along its entire tangential extent. In comparison with the exemplary embodiment according to FIGS. 9 to 14, therefore, the double clamping tongues 17 in the exemplary embodiment according to FIGS. 15 to 17 have a lower elastic flexibility, with the result that a higher torque can be transmitted.

The exemplary embodiment according to FIGS. 18 to 23 shows a freewheel coupling 1 which is designed as an axial ratchet and the basic functioning of which is identical to that of the form of construction according to FIG. 1. In contrast to this form of construction, however, the clamping tongues 15, 16 are designed as deep-drawn clamping pockets, in a similar way to the embodiment according to FIGS. 15 to 17.

Figure 18:
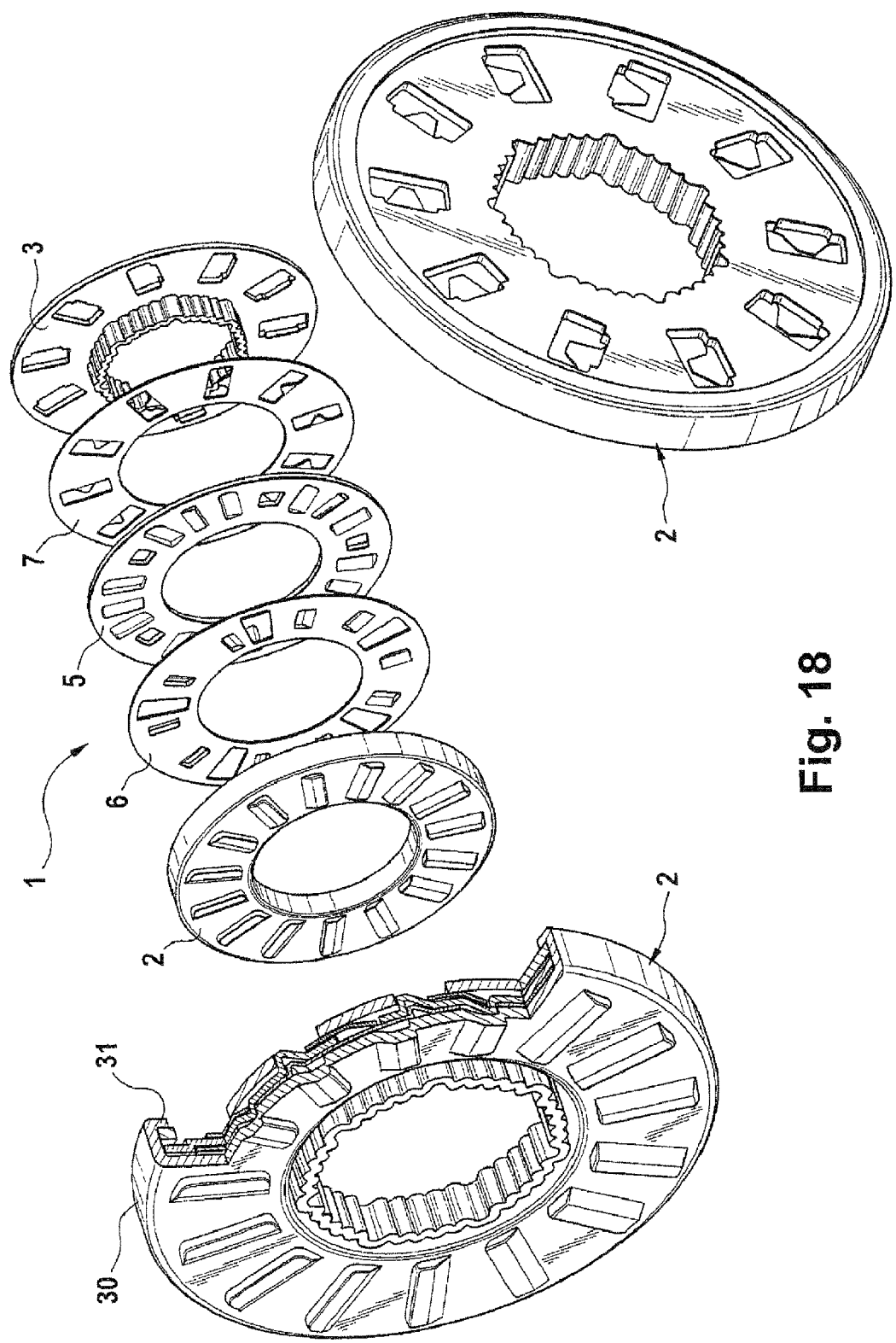
FIG. 18 shows an embodiment, modified with respect to the embodiment according to FIG. 1, of a freewheel coupling in an exploded illustration.
Figure 20:
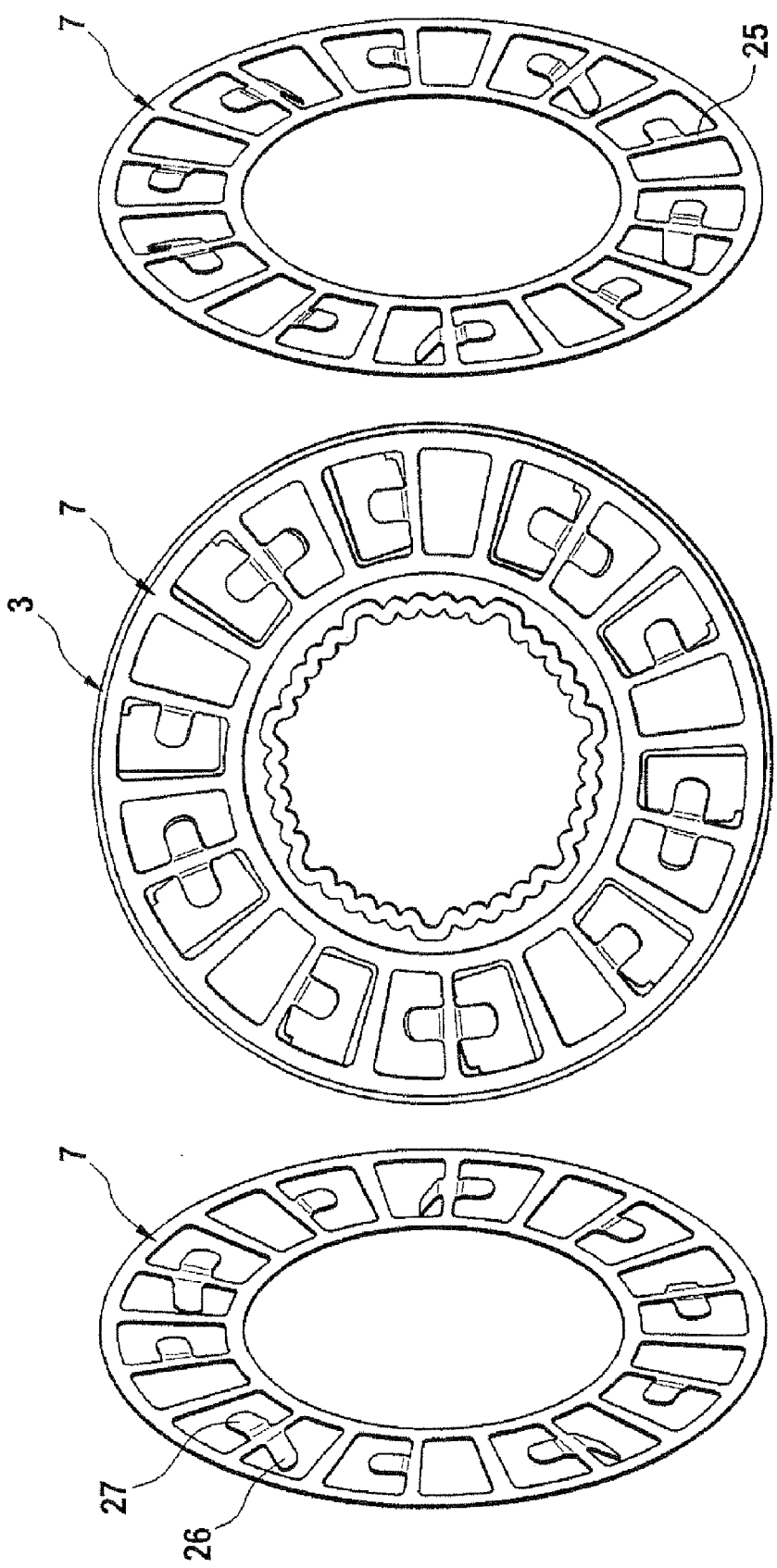
FIG. 20 shows a spring ring and the inner ring of the freewheel coupling according to FIG. 18.
Figure 21:
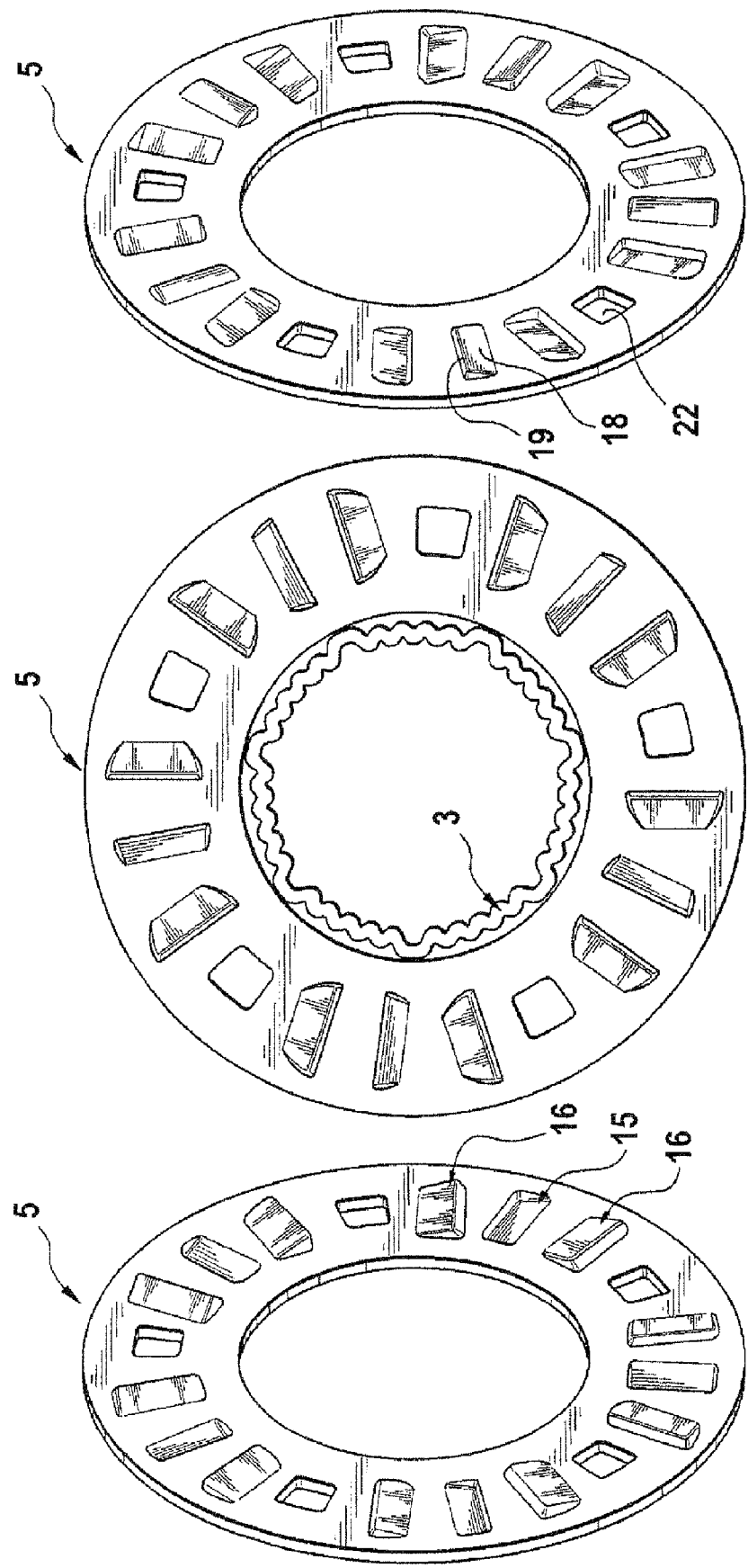
FIG. 21 shows a clamping ring and the inner ring of the freewheel coupling according to FIG. 18.
Figure 23:
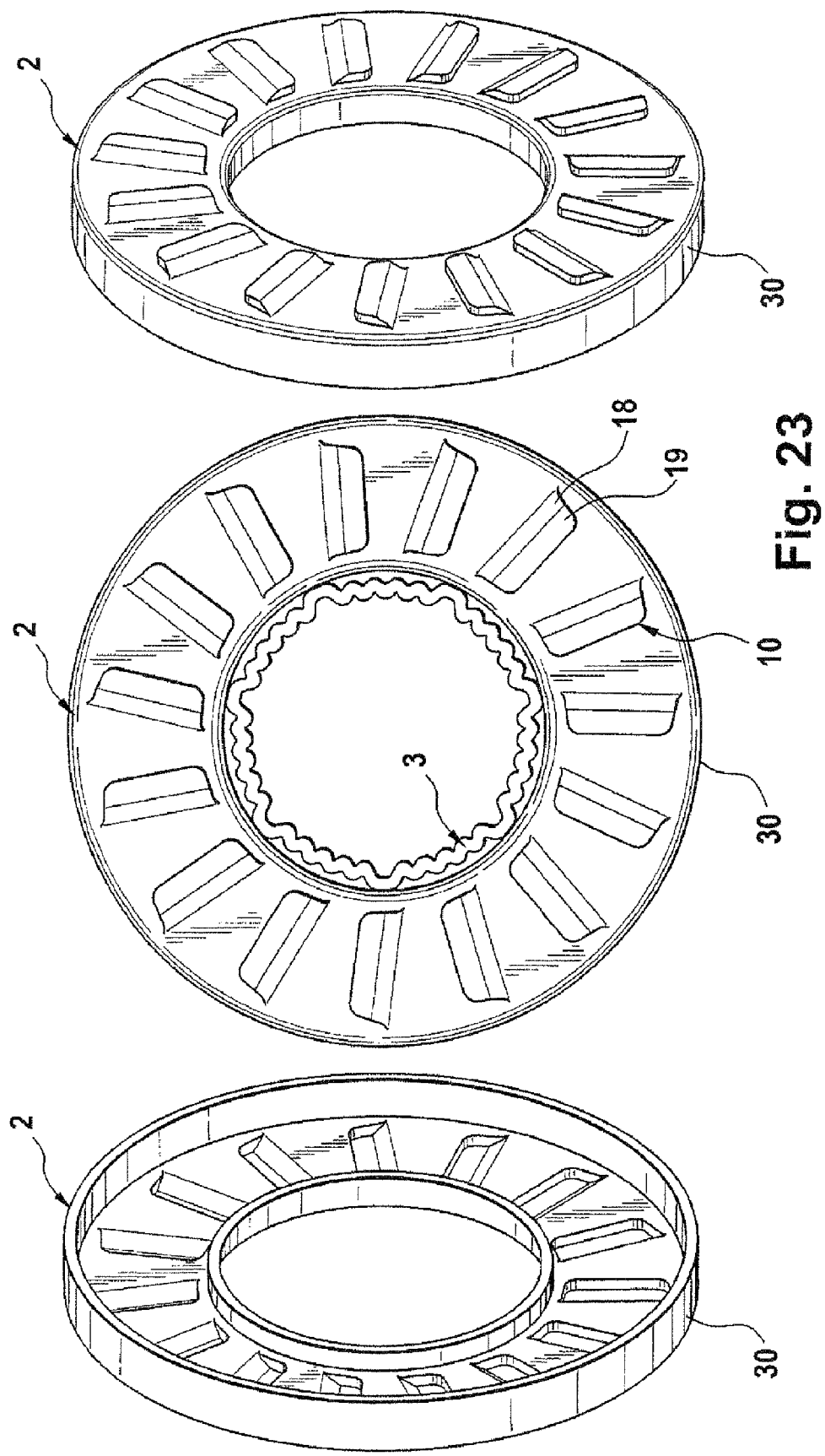
FIG. 23 shows an outer ring and the inner ring of the freewheel coupling according to FIG. 18.

As may be gathered from the various views in FIG. 21, the clamping ring 5 of the freewheel coupling 1 according to FIG. 18 has only five apertures 22 between which in each case three clamping pockets 15, 16 are located. Of these, a middle clamping pocket 15 faces the outer ring 2, while two outer clamping pockets 16 adjacent to the inner clamping pocket 15 face the inner ring 3. The control faces 21 of the drag ring 6 cooperating with the clamping ring 5 are designed as pocket-shaped depressions in a comparable way to the portions 18, 19 of the clamping ring 5 which are formed by the clamping pockets 15, 16.

As in the other embodiments, the latching structures 10 on the outer ring 2 are formed by clamping ramps, whereas the latching structures 11 on the inner ring 3 are implemented in the form of clearances 29. The number of clamping ramps 10 amounts to fifteen and therefore to 1.5 times the number of clearances 29.

As may be gathered from FIG. 18, the outer ring 2 has an outer wall 30 which is in the form of the surface area of a cylinder and surrounds the clamping ring 5, the drag ring 6 and the spring ring 7 and this has adjoining it radially inward a rim 31 which surrounds the inner ring 3 in such a way that all the components 2, 3, 5, 6, 7 of the freewheel coupling 1 are captively connected to one another as a structural unit.

| Reference Symbols | |
|---|---|
| 1 | Freewheel coupling |
| 2 | Outer ring |
| 3 | Inner ring |
| 4 | Gap space |
| 5 | Clamping ring |
| 6 | Drag ring |
| 7 | Spring ring |
| 8 | Clamping track |
| 9 | Clamping track |
| 10 | Latching structure |
| 11 | Latching structure |
| 12 | Marginal strip |
| 13 | Marginal strip |
| 14 | Web |
| 15 | Clamping tongue |
| 16 | Clamping tongue |
| 17 | Double clamping tongue |
| 18 | Inner portion |
| 19 | Outer portion |
| 20 | Stop face |

| | Reference Symbols |
|---|---|
| 21 | Control face |
| 22 | Aperture |
| 23 | Marginal strip |
| 24 | Marginal strip |
| 25 | Web |
| 26 | Spring tongue |
| 27 | Spring tongue |
| 28 | Slot |
| 29 | Clearance |
| 30 | Outer wall |
| 31 | Rim |
| A | Axis of rotation |
| H | Distance |

The invention claimed is:

1. A positive freewheel coupling, comprising:
a first clamping track having latching structures;
a second clamping track having latching structures;
a gap space formed between the first clamping track and the second clamping track;
a clamping ring which is arranged in the gap space and which has a number of clamping tongues facing the first clamping track and a number of clamping tongues facing the second clamping track; and
a drag ring which is arranged in the gap space and which is pivotable in relation to the clamping ring and is sprung toward one of the clamping tracks and which cooperates with the clamping ring in such a way that, during rotation of the first clamping track in relation to the second clamping track in a freewheel direction, the clamping ring lifts off completely from one clamping track, while the clamping tongues facing away from the one clamping track penetrate into the latching structures of the other clamping track.

2. The freewheel coupling of claim 1, wherein the clamping ring and the drag ring are arranged axially between the first clamping track and the second clamping track.

3. The freewheel coupling of claim 2, further comprising a spring ring arranged in the gap space.

4. The freewheel coupling of claim 3, wherein the spring ring biases the clamping ring and the drag ring.

5. The freewheel coupling of claim 4, wherein the spring ring has two annular marginal strips which are connected to one another by means of webs running in a radial direction, spring tongues projecting out of each of the webs and being provided for biasing the clamping ring and for biasing the drag ring.

6. The freewheel coupling of claim 5, wherein one of the spring tongues contacting the drag ring is shorter than the other of the tongues contacting the clamping ring.

7. The freewheel coupling of claim 2, wherein the first clamping track and the second clamping track are spaced a fixed distance apart.

8. The freewheel coupling of claim 1, wherein the damping ring and the drag ring are arranged radially between the first clamping track and the second clamping track.

9. The freewheel coupling of claim 8, wherein the clamping ring is a spring element.

10. The freewheel coupling of claim 8, wherein the clamping ring is manufactured as a bent band, between ends of which a slot is formed.

11. The freewheel coupling of claim 8, wherein the drag ring is arranged under pretension on an inner ring.

12. The freewheel coupling of claim 1, wherein one of the damping tongues facing the first clamping track together with a one of the clamping tongues facing the second clamping track forms a double clamping tongue which is held between two marginal strips of the damping ring.

13. The freewheel coupling of claim 12, wherein the double clamping tongue is arranged between the marginal strips so as to be capable of experiencing torsion by means of a web.

14. The freewheel coupling of claim 1, wherein the clamping tongues are clamping pockets.

15. The freewheel coupling of claim 14, wherein a number of clamping pockets facing the first clamping track is different from the number of clamping pockets facing the second clamping track.

16. The freewheel coupling of claim 12, wherein each of the clamping tongues has an outer portion bent with respect to an inner portion, the outer portion being inclined to a lesser extent in relation to the marginal strips than the inner portion.

17. The freewheel coupling of claim 1, wherein the drag ring has marginal strips and control faces which are inclined in relation to the marginal strips and which are intended to cooperate with the clamping ring.

* * * * *